Aug. 26, 1941.                C. R. PATON                2,253,645
                            MOTOR VEHICLE
            Filed May 7, 1938              5 Sheets-Sheet 4
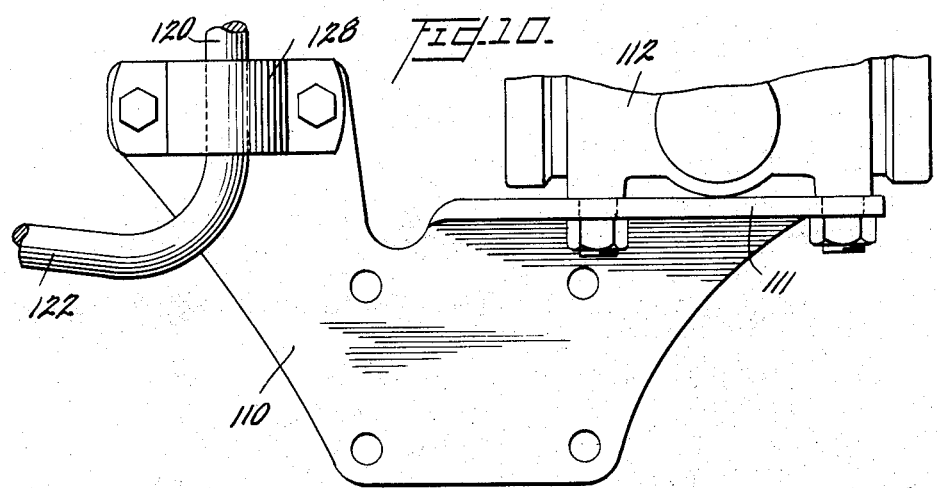
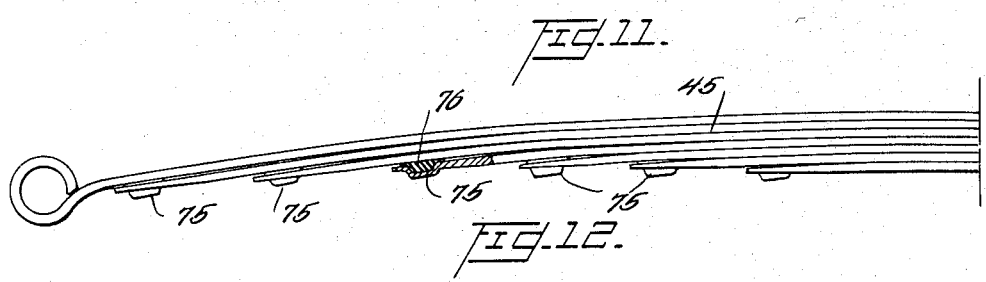
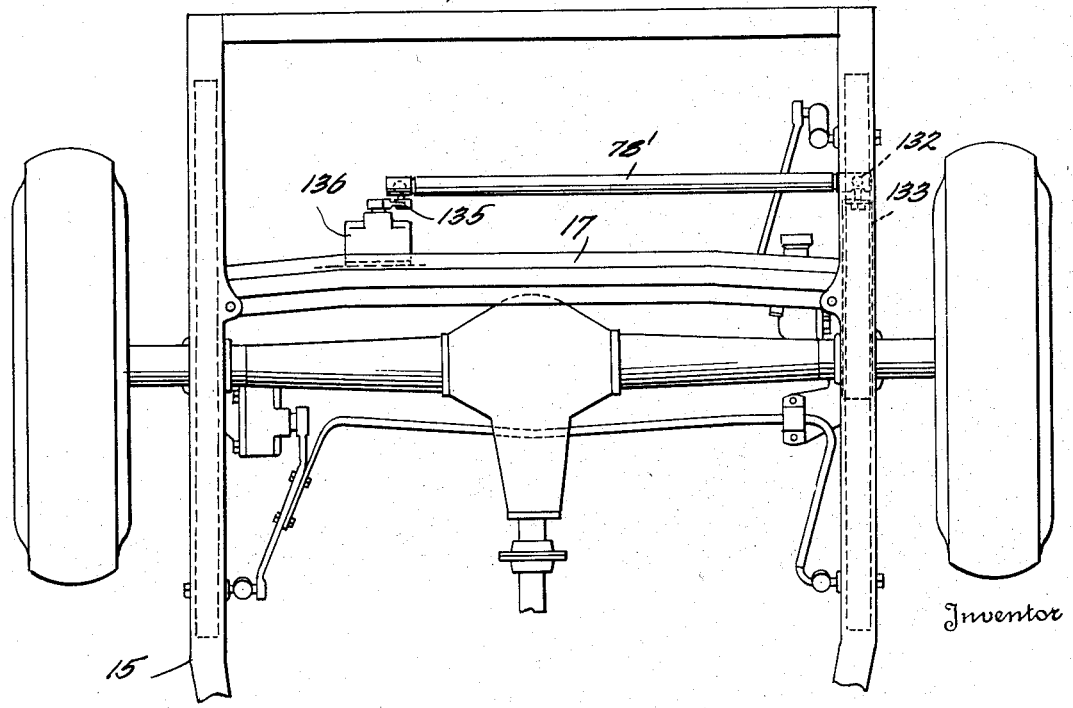

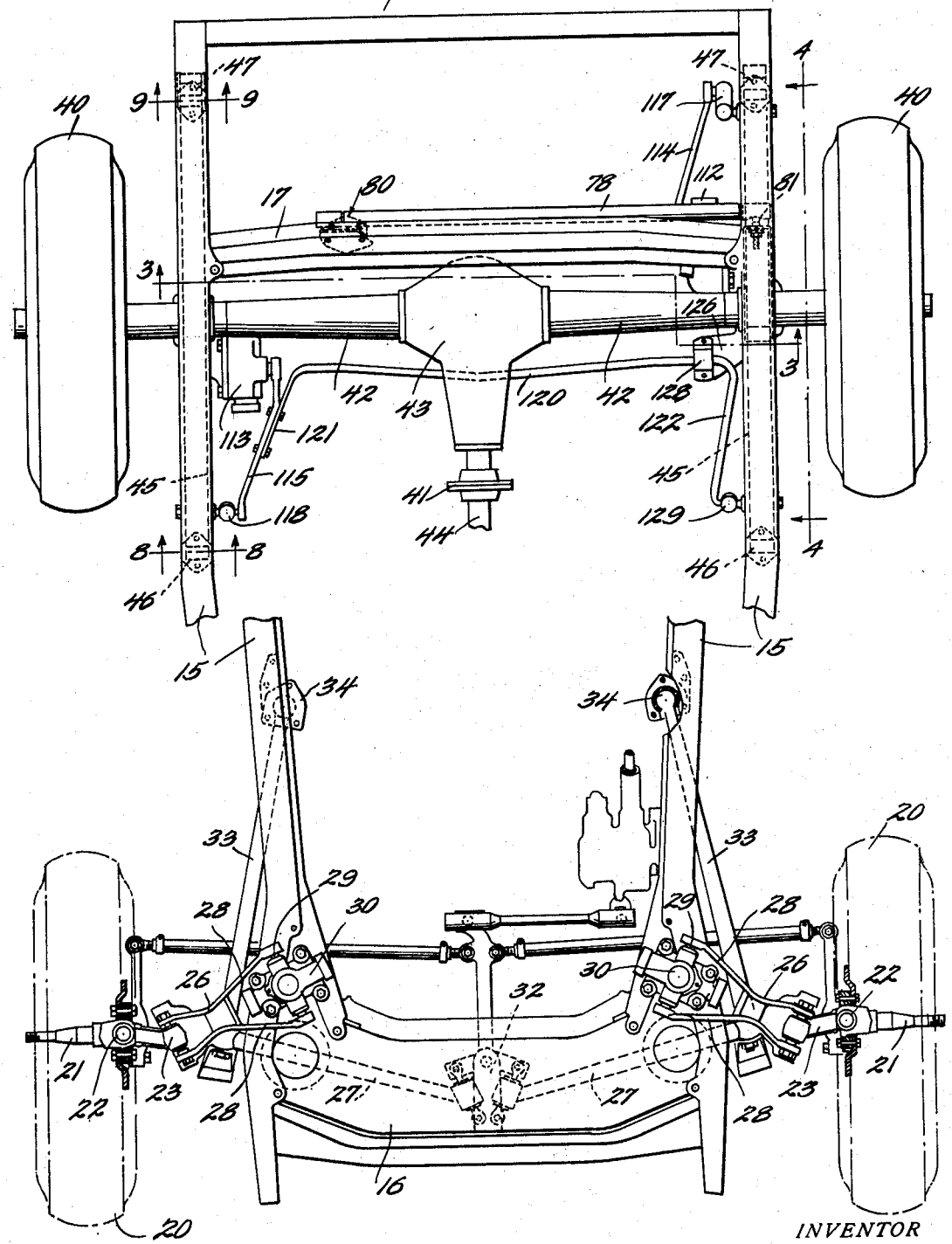

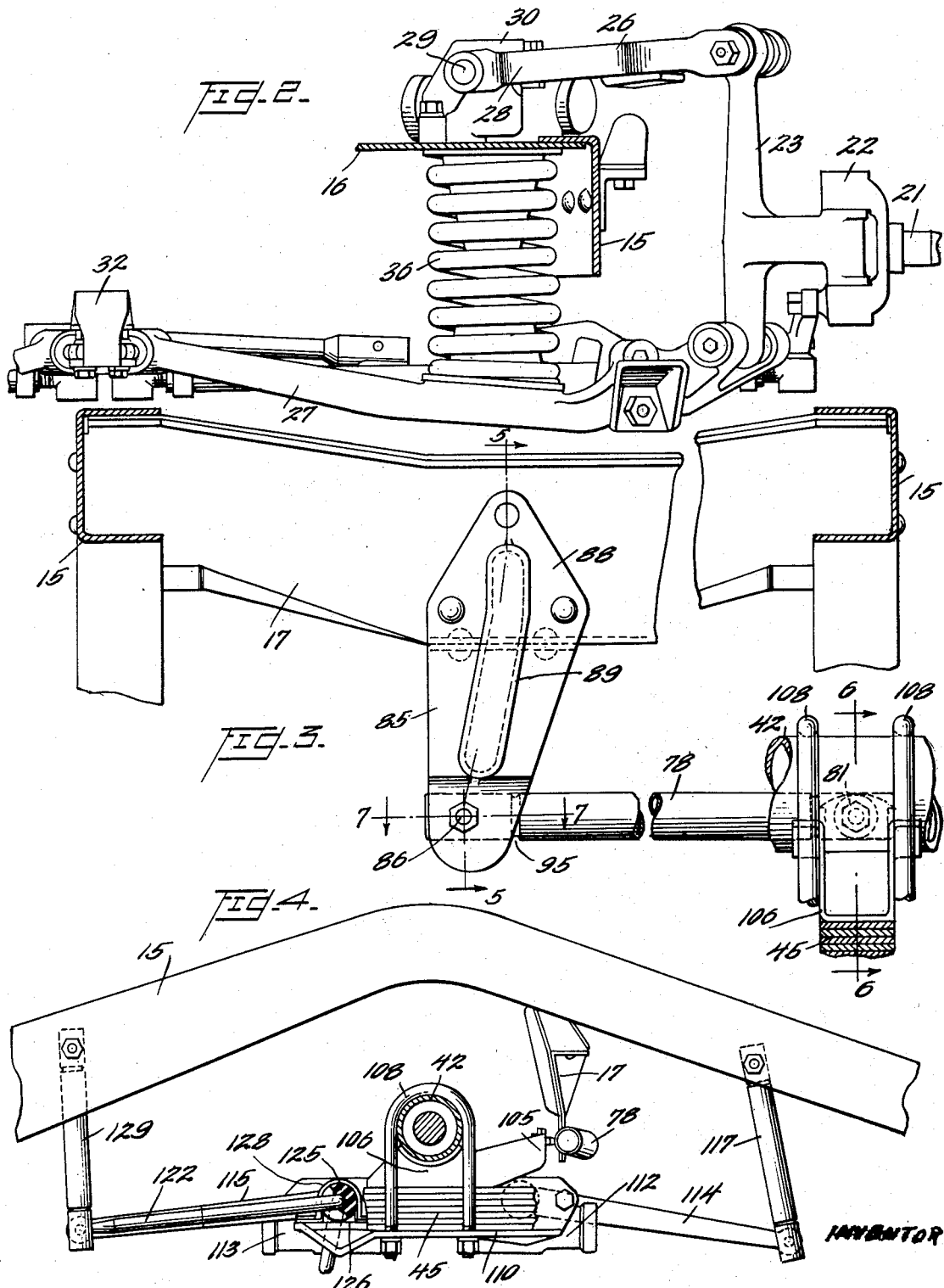

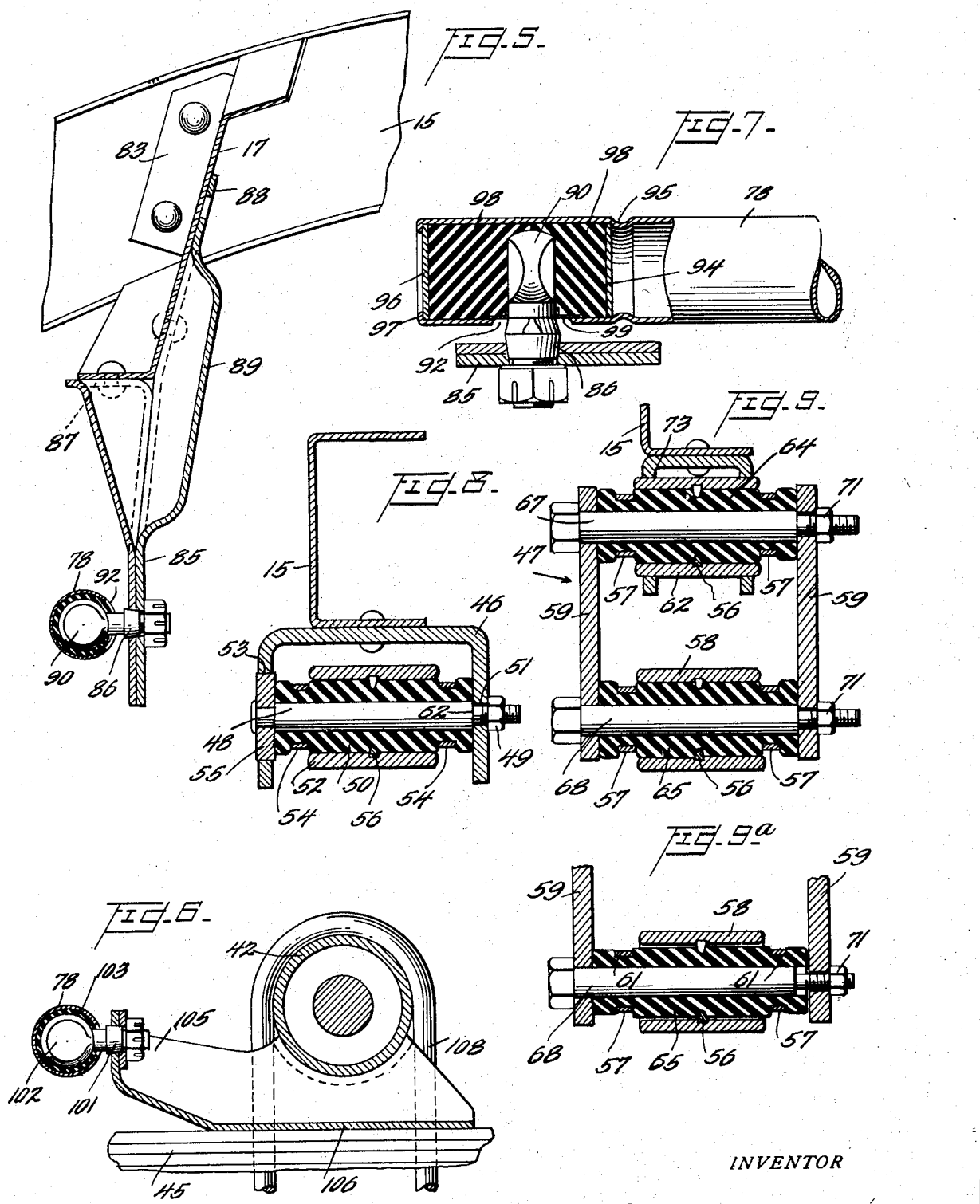

Aug. 26, 1941.                  C. R. PATON                    2,253,645
                              MOTOR VEHICLE
                        Filed May 7, 1938          5 Sheets-Sheet 5
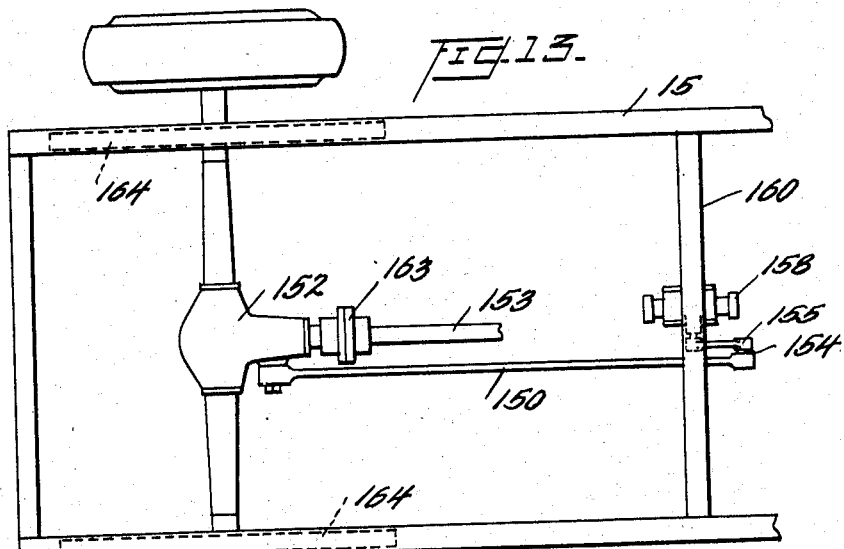
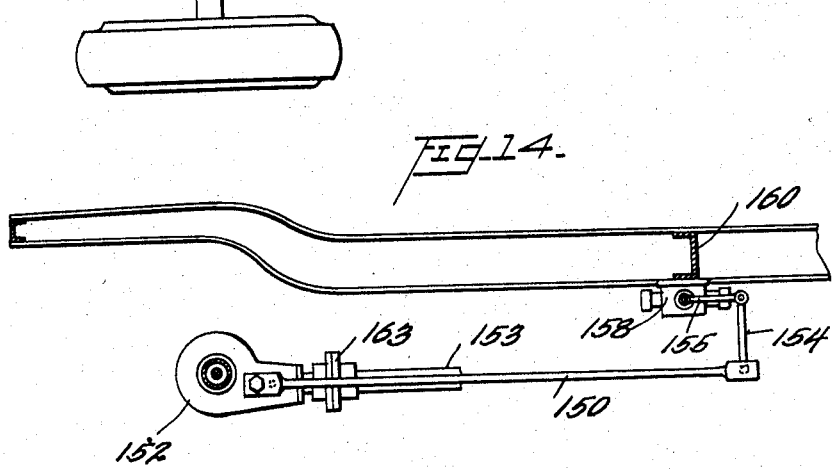
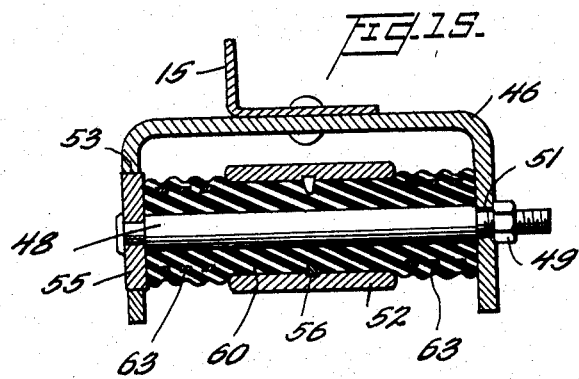
Inventor
C. R. Paton,
By Watson, Cole, Grindle
and Watson
                                                        Attorney Patented Aug. 26, 1941

2,253,645

UNITED STATES PATENT OFFICE 2,253,645

MOTOR VEHICLE

Clyde R. Paton, Birmingham, Mich., assignor to Packard Motor Car Company, Detroit, Mich., a corporation of Michigan Application May 7, 1938, Serial No. 206,646

13 Claims. (Cl. 267—11)

This invention relates to motor vehicles, and is particularly concerned with improvements in elastic suspension systems therefor and in the correlation of such suspension systems with the vehicle propulsion means. An object of these improvements is to promote smoothness of operation of the vehicle, to minimize undesirable vehicle body movements, and to reduce vibration.

With the advent and wide adoption in this country, usually at the forward end of the vehicle only, of the type of suspension system commonly referred to as independent, which permits the employment of coil compression vehicle springs, lack of equally smooth riding qualities at the vehicle rear as the result of the employment there of more conventional types of suspension became increasingly evident. In some respects the ride at the vehicle rear is actually adversely affected by the adoption of forward independent suspensions. For example, lateral movement of the rear of the vehicle body with respect to the rear axle means, noticeable and objectionable in vehicles employing conventional leaf spring suspensions at the front and the rear, is increased in amplitude to some extent by the adoption of a front independent suspension. Thus with the reduction of lateral movement of the body at the forward end incident to the independent suspension, the point about which the body swings laterally is displaced from the midpoint toward the forward end of the vehicle, and rear body swing thereby increased. It is one of the objects of the invention to overcome this difficulty while retaining the advantages of forward independent suspension.

It is found that when one road wheel rises or falls abruptly with respect to the opposite wheel, the vehicle body is thrust laterally. Thus in a vehicle employing a rigid axle, leaf spring suspension, when one wheel meets an obstacle and rises, the axle swings upwardly about the point of contact of the opposite wheel with the road bed. The longitudinal vertical planes passing through the points of connection of the oppositely disposed springs to the axle are thus brought closer, and one or both of the springs must flex laterally. That spring which is the flatter of the two is more resistant to lateral flexure, and the body is displaced toward the opposite side, the opposite spring yielding laterally to permit such movement. The lateral impact thus applied to the body is usually severe owing to the edgewise stiffness of the conventional leaf spring assembly.

It is accordingly proposed as part of the instant invention to cushion the force of this impact by incorporating some degree of lateral freedom in the elastic system, for example, by reducing the resistance offered by the springs to lateral flexure, or by employing laterally yielding connections between the springs and the vehicle members with which they are associated. Since I have found that such lateral freedom, while effective in reducing shock, is conducive to persistence of lateral swinging movement of the body with respect to the wheels, I propose further to employ means which will restrict or damp such body movement without, however, interfering with the free spring flexure which is desirable for the reason just mentioned.

It is also proposed as a part of the present invention to employ, at the rear of the vehicle, leaf springs which are so constructed or so assembled in the vehicle structure that the damping of movement in the elastic system is relatively low, whereby a softer ride may be obtained. However, as the damping of the springs is decreased in a vehicle employing the well-known Hotchkiss type of drive, in which rotation of the rear axle housing about a transverse axis is resisted largely by the springs, axle rotation in response to braking or driving torque becomes more pronounced, with accompanying brake or clutch chatter. It is also found with springs of low damping characteristics that in driving over sand or snow, the wheels crawl upwardly on the soft surface, and as the vehicle weight breaks down this surface, the axle drops; this up and down motion rotates the axle, setting up vibrational disturbances in the clutch and brakes. Such chatter also results from the employment of low damped springs when the vehicle wheels bounce in passing over certain types of uneven road surface. It is, therefore, a feature of the present invention that such axle rotation is adequately resisted and the vibrational disturbances in question effectively damped without sacrificing the various advantages attendant upon the use of springs having low damping.

In the preferred form of the invention, rotation of the axle and differential housings about a transverse axis is resisted principally by shock-absorbing devices, which may also serve the more conventional function of resisting relative vertical movements of the frame and axle, and these devices are preferably so connected between the axle and the frame that substantially the same degree of resistance is offered to rotation of the axle in either direction. Furthermore, the arrangement may be such that these same shock absorbing devices oppose rising and falling movement of the axle in such manner as to avoid imparting to the axle any force tending to rotate the latter about a transverse axis.

Further objects and features of the invention will be apparent from the following description taken in connection with the accompanying drawings, in which Figure 1 is a plan view of a motor vehicle chassis showing the vehicle frame and suspension means, and illustrating one mode of applying the principles of the invention;

Figure 2 is a front elevation of the forward suspension at one side of the vehicle;

Figure 3 is a transverse sectional view taken substantially on the line 3—3 of Figure 1;

Figure 4 is a longitudinal sectional view taken on the line 4—4 of Figure 1;

Figure 5 is a sectional view on the line 5—5 of Figure 3;

Figure 6 is a section on the line 6—6 of Figure 3;

Figure 7 is a fragmentary sectional view on the line 7—7 of Figure 3;

Figure 8 is a section on the line 8—8 of Figure 1;

Figure 9 is a section on the line 9—9 of Figure 1;

Figure 9a is a sectional view corresponding to a portion of Figure 9, illustrating several elements in incompletely assembled relation;

Figure 10 is a plan view of a portion of the structure shown in Figure 1 with certain parts removed;

Figure 11 is a side elevation of one of the leaf springs shown in Figure 1;

Figure 12 is a plan view of a part of the structure shown in Figure 1 illustrating a modified construction;

Figure 13 is a similar plan view illustrating a further modification;

Figure 14 is a side elevation of the structure shown in Figure 13; and

Figure 15 is a view corresponding to Figure 8, illustrating a modified construction.

In order to facilitate an understanding of the invention, reference is made hereinafter to the several embodiments thereof illustrated in the accompanying drawings and specific language is employed. It will nevertheless be understood that no limitation of the scope of the invention is intended thereby, but that various further modifications and alterations of the illustrated structure are contemplated such as would occur to one skilled in the art.

The vehicle frame illustrated in the drawings comprises longitudinally extending side frame members 15, forward cross frame members 16, and a rearward cross frame member 17, and may include various other structural reinforcing members which are not required to be shown in order that the invention may be understood. Associated with the forward end of the vehicle are road wheels 20, and the suspension for these road wheels is of the independent type. The details of this suspension form no part of the instant invention, and it is necessary only to describe the construction briefly, a more detailed description being found in the prior applications of Clyde R. Paton, Serial No. 702,615, and Walter R. Griswold, Serial No. 45,347.

Each forward road wheel is supported on a wheel spindle 21 which forms one member of a steering knuckle 22. The other member of this knuckle has formed integrally therewith an upstanding wheel carrying member 23 which is in turn supported on the vehicle frame by generally parallel links 26 and 27, each of these links being pivoted at its outer end to the wheel carrying member 23 and at its inner end to the frame. Thus the upper link 26 is formed as shown more particularly in Figure 1 to provide inwardly divergent arms 28 which are secured at their inner ends to the operating shaft 29 of a shock absorber 30, the latter being mounted on the cross frame member 16 and side frame member 15 at the juncture thereof. Each lower link 27 is pivotally mounted on a bracket 32 which is secured beneath the cross frame member 16. A torque arm 33, extending generally longitudinally of the vehicle, is secured at its forward end to the lower link 27 and is pivoted at its rearward end as indicated at 34 to the adjacent side frame member 15 so as to form with the link a rigid, generally V-shaped structure through which the principal stresses are transmitted from the wheel to the frame. It will be observed that the link 27 and torque arm 33 may swing about an axis passing through the points of pivotal connection of these members to the frame, which axis is inclined in a horizontal plane so as to form an acute angle with the longitudinal center line of the vehicle. The axes of pivotal connection of the links 26 and 27 to the wheel carrying member and the axis of the actuating shaft 29 of the shock absorber 30 are parallel to the aforesaid inclined axis. It will thus be observed that the links 26 and 27 constitute a parallel linkage system, whereby the associated road wheel 20 is permitted to rise and fall with respect to the vehicle frame, and thus there is substantially no relative lateral movement of the axle means and the frame.

Interposed under compression between the lower link 27 and the cross frame member 16 is a coil spring 36, this spring serving to yieldingly resist the rising movement of the link and of the associated road wheel. Suitable steering mechanism is associated with the wheel suspension, which mechanism is so coordinated with the suspension as to afford perfect steering geometry, there being no appreciable displacement of the elements of the steering mechanism as the wheels move vertically.

The rear road wheels 40, which preferably constitute the driving wheels of the vehicle, are supported on transversely extending axle housings 42, each of which is secured to a centrally disposed differential housing 43. It will be understood that the road wheels are driven through live axles within the housings 42 from gearing within the differential housing 43, this gearing being in turn driven from a drive shaft 44 which shaft extends forwardly to the vehicle power plant, not shown. The drive is of the well-known Hotchkiss type which employs no torque tube about the drive shaft, universal joints being interposed in the drive shaft adjacent the differential housing and the power plant, one of these joints being indicated at 41. In this system of drive the braking and driving torque on the axle and differential housings is normally resisted solely by the vehicle suspension springs as hereinbefore explained.

The suspension system selected for the purpose of illustration includes leaf spring assemblies 45, one of which is disposed at each side of the vehicle and is secured to the vehicle body at its forward end by a spring hanger 46 and at its rearward end by a shackle 47. Spring hanger 46 may be secured to the lower flange of the adjacent side frame member 15, and may be generally U-shaped in section, as shown more particularly in Figure 8, the legs of the hanger being apertured as at 51 and 53 respectively to permit the passage therethrough of a bolt 48 retained in position in the hanger by means of a nut 49. Surrounding the bolt 48 is a bushing 50 of rubber or similar deformable material, this bushing being received in the spring eye 52 formed at one end of the spring. A collar 55 secured to one end of the bolt 48 fits snugly within the aperture 53, it being noted that this aperture is sufficiently large to permit the passage therethrough of the rubber bushing 50.

It will be noted that the bushing 50 is formed with a central body portion which is initially of such diameter that it may be introduced without difficulty in the spring eye 52, each of the end portions of the bushing having assembled thereon an annular band 54. As the nut 49 is threaded on the bolt 48, the bushing is compressed between the collar 55 and the opposite leg of the hanger 46, so that the rubber is radially expanded, and is forced with considerable pressure against the inner surface of the eye 52 and the outer surface of the bolt 48, compression being limited by the shoulder 62 on the bolt. Radial expansion of the end portions of the bushing is restricted to some extent by the bands 54, which permit the axial compression of a relatively long bushing and at the same time prevent excessive radial flow of rubber and the formation of unnecessarily large flanges at the ends of the bushing, which flanges become chafed by rubbing against the legs of the hanger and the ends of the spring eye and require frequent replacement. If desired, a split ring 56, seated in an annular recess in the spring eye, may be employed to prevent endwise displacement of the bushing 50 in the eye, but this is ordinarily not necessary provided the bushing is sufficiently compressed and expanded, the rubber being, in effect, surface bonded by friction to the metal surfaces with which it is contacted under pressure.

Turning now to Figure 9, which illustrates one method of connecting the rear end of each leaf spring assembly to the frame, it will be observed that the construction is generally similar to that just described, the eye 58 at the rear of the spring assembly being received between plate members 59 which constitute the shackle 47. Also received between the members 59 and the shackle is a sleeve 62. Embraced by the sleeve 62 and the eye 58 are bushings indicated at 64 and 65 respectively, these bushings being generally similar to the bushing 50 heretofore referred to and being formed of resilient material such as rubber. The bushing 64 is received on a bolt 67 and the bushing 65 on a bolt 68. The members 59 are apertured to receive the reduced end portions of these bolts, each bolt being threaded at one end to receive a nut 71. The end portions of the bushings 64 and 65 are surrounded by annular bands 57 and split rings 56 may be employed to prevent endwise displacement of the bushings within the spring eye 58 and the sleeve 62 as in the construction shown in Figure 8. The sleeve 62 is secured in apertures in the arms of a yoke member 73, the latter being in turn secured to the lower flange of the adjacent side frame member 15.

Figure 9a illustrates the lower portion of the shackle just described prior to the application of axial pressure to the rubber bushing 65. It will be noted that the annular bands 57 are received in recesses 61 in the bushing and they may be vulcanized in these recesses. The end portions of the bushing are of less diameter than the central portion thereof and the latter is dimensioned so that it may be readily received in the spring eye 58. As the nut 71 is tightened, axial pressure is applied to the bushing which causes the central portion thereof to expand and grip tightly the eye 58 and the bolt 68. The end portions of the bushings are likewise expanded radially, but such expansion is limited by the bands 57. The initial length of the bushing is such that after compression there is a sufficient length of the bushing interposed between shackle members 59 and the ends of the spring eye 58 to permit considerable lateral movement of the spring eye within the shackle and to permit rotation of the spring eye as the spring is flexed without chafing or applying undue stress to the end portions of the bushing.

Turning now to Figure 15, it will be observed that a modification of the structure just described is disclosed. The device is here illustrated as applied to the connection between the forward end of the spring and the body; the application of this modified form to the shackle at the rear of the spring is obvious.

All of the elements of this modification correspond to those of Figure 8 with the exception of the bushing and corresponding reference characters are used to identify them. The bushing, indicated at 60, is of rubber or other deformable material and is of generally cylindrical shape, being considerably longer than the space between the legs of the spring hanger 46 even after compression. In lieu of the annular bands 54 employed in the form of the invention shown in Figure 8 to prevent excessive spreading or radial flow of rubber at the ends of the bushing as the result of compression, a coil spring 63 is embedded in the bushing at each end thereof. As the bushing is compressed, both during the assembling thereof and in subsequent operation as the result of relative lateral movement of the hanger and the spring eye 52, the spring is of course accordingly compressed and thus supports the bushing in yieldingly opposing such lateral movement.

It will be observed that by these constructions the spring is completely insulated from the frame by the resilient material of which the bushings are formed so as to prevent the transmission of vibrational disturbances and shock to the frame and to reduce the stresses applied to the spring assemblies during operation of the vehicle, the rubber yielding in response to forces tending to twist the spring and readily permitting the ordinary flexing of the spring to accommodate rising and falling movement of the wheels. Again, the lateral freedom of movement between the leaf springs and the body which is permitted by these constructions is sufficient to materially reduce and cushion any lateral impact or shock which would otherwise be applied to the body as the vehicle passes over an uneven rod bed.

In the practice of my invention, I prefer to employ leaf spring assemblies in which the damping of spring flexure, both vertical and lateral, is relatively low. One such assembly is described in my copending application Serial No. 197,476, filed March 22, 1938, the detailed construction being claimed more specifically therein; for the purposes of the present application it suffices to state that the spring action is modified to afford a flat ride, and the spring assembly may be described as offering relatively low damping, particularly with respect to vertical flexure resulting from rapid wheel movements of large amplitude. The improved characteristics of the assembly are obtained by the use of bearings or bearing means intermediate the several spring leaves, the bearing means preferably comprising inserts 76 of rubber, self-lubricating bronze, lead alloys, and like materials. These inserts may be received in depressions 75 formed in the tip portions of the several leaves of the spring, and serve to space the adjacent leaves throughout a portion of their length. By suitable selection of the materials of which these inserts are composed and of their disposition between the several spring leaves, I am enabled readily to adjust the spring characteristics. By the employment of inserts of rubber, or other materials which substantially eliminate interleaf friction, between the longer leaves of the assembly, I am enabled not only to materially reduce the damping of vertical wheel movements, but I thereby reduce the resistance of the spring assembly to lateral flexure. Thus it is possible to achieve the desired lateral freedom of spring movement either by way of modification of the shackles, as hereinbefore described, by the use of suitable bearing means between the spring leaves, or by a combination of these methods.

As hereinbefore pointed out, the reduction of spring damping and of the resistance offered by the springs and their connections to lateral flexure substantially improves the softness of the ride, but is usually accompanied by objectionable persistence of lateral swinging movement of the body and by rotation of the axle and differential housings about a transverse axis; these disadvantages are eliminated by means hereinafter described without adversely affecting the desirable results normally flowing from a vehicle suspension of the character described.

Thus in order to prevent lateral swinging movement of the body, commonly referred to as body float, it is proposed as part of the instant invention to connect the frame and axle by means of a transverse link 78, this link preferably extending generally parallel to the axle and being of sufficient length to afford approximately the proper geometry of movement, so that the axle need not be deflected materially from its normal path as it rises and falls with respect to the frame. Thus the link 78 which may be tubular in transverse section, is pivotally connected as indicated generally at 80 in Figure 1 of the drawings to the cross frame member 17 and as indicated generally at 81 to the axle housing 42 at the opposite side of the vehicle. The connection between the link 78 and the cross frame member 17 is shown more particularly in Figure 5. In this figure the cross frame member is shown as generally Z-shaped in transverse section and as provided with flanged portions 83 by means of which it is secured at its opposite ends to the side frame members 15. A bracket 85 which is apertured to receive a bolt 86 is comprised of two metal plates, these plates being in face to face relation at their lower ends, one of the plates being deformed as shown in the drawings to provide a generally horizontally directed flange 87 which is secured to the lower flange of the cross frame member 17. The other of the plates is provided with an upwardly directed portion 88 which is secured to the main web of the cross frame member 17, a suitable reinforcing rib 89 being formed therein. The bolt 86 is formed to provide at one end thereof a generally flattened head 90, this head extending through an aperture 92 in the wall of the tubular link adjacent one end of the latter. Received within this portion of the link 78 is a generally circular disk 94 which is retained against displacement axially of the link by the formation in the wall of the latter of an annular depression 95. A second disk 96 is received within the extreme end of the link 78, the latter being crimped as indicated at 97 to retain the disk 96 in position. The disks 94 and 96, together with that portion of the link 78 extending therebetween form a generally cylindrical pocket in which are located two blocks 98 of rubber or similar deformable material, the head 90 of the bolt 86 lying between these deformable blocks. A collar 99 on the bolt 86 prevents extrusion of the rubber through the aperture 92 while permitting rotation and slight endwise displacement of the link 78 on the bolt. At this opposite end the link 78 is similarly formed to receive a bolt 101, identical with the bolt 86, and having a head portion 102 positioned within the end of the link, rubber, as indicated at 103, being interposed between the link and the bolt as hereinbefore described. The bolt 101 is secured rigidly to a flange 105 formed on a spring seat 106, this seat being constructed to partially embrace the adjacent axle housing 42 and to engage with the adjacent leaf spring assembly 45, a spring bolt 108 surrounding the axle and extending through the spring block 110, disposed beneath and engaging the underside of the spring assembly 45, whereby the latter is securely clamped to the axle housing 42.

It will be appreciated that the link 78 prevents the unrestricted lateral swinging of the body which would otherwise occur by reason of the lateral freedom characterizing the elastic suspension system described herein. The rubber connections employed at the ends of the link function as bearings requiring no lubrication and are sufficiently yieldable to absorb and prevent the transmission of vibrational disturbances between the axle and the body. Furthermore, these rubber connections compensate for any imperfections in the geometrical arrangement, so that the axle is not constrained to move in an arcuate path about the point of pivotal connection of the link to the frame as the road wheels rise and fall, but may move in a normal vertical path.

Each spring block 110 is provided, as shown more particularly in Figure 10, with an upstanding flange 111 at its inner side, the flange on the block at one side of the axle being disposed rearwardly of the axle and the corresponding flange at the opposite side being disposed forwardly of the axle. Shock absorbers, preferably of the fluid reciprocating type, are secured to the inner faces of these upstanding flanges, these shock absorbers being indicated at 112 and 113 respectively. The details of these shock absorbers may be largely conventional. Thus each may be formed to provide a cylinder in which is reciprocated a piston, the opposite ends of the cylinder communicating through fluid passages controlled by one-way valves, so that as the piston is reciprocated in opposite directions, the fluid is forced alternately through these passages from one end of the cylinder to the other. Each passage is provided with a control valve to suitably restrict the same, and by adjustment of these valves it is possible to so regulate the action of the shock absorber that considerably more resistance is offered to the movement of the piston in one direction than in the other. Thus it is customary to so adjust the shock absorber that on the compression stroke of the piston, namely that direction in which the piston moves when the wheels rise, less resistance is offered than on the rebound stroke of the piston, corresponding to the upward movement of the body as the result of previous compression of the vehicle springs.

It is also common in this type of shock absorber to effect reciprocation of the piston by means of an arm secured to an actuating shaft which is in turn connected to the piston. The actuating arm 114 for the shock absorber 112 extends rearwardly from the latter as shown in Figures 1 and 4, and is connected to the adjacent side frame member 15 by means of a link 117 having articulated connection with the side frame member and the arm. The actuating arm 115 for the shock absorber 113 extends forwardly from the latter and is connected to the adjacent side frame member 16 by means of a link 118, this link similarly being pivotally connected to the arm 115 and the side frame member.

It will be observed that with this construction rapid accelerative vertical movement of the axle and differential housings with respect to the body is opposed by the shock absorbers 112 and 113, both of which act in compression on upward movement of the axle and in rebound on downward movement of the axle. By reason of the fact that the shock absorber arms extend in opposite directions, there is no tendency to rotate the axle housings as the latter rise and fall, the resisting forces applied by the shock absorbers being precisely balanced so that immediate actuation and response of the absorbers on the initiation of axle movement is assured. This is of particular importance in a vehicle employing springs of low damping in which the resistance to rotation of the axle offered by the vehicle springs is greatly reduced. It will further be observed that any tendency of the axle and differential housings to rotate as the result of the application of braking or driving torque thereto, which tendency is inadequately opposed by the springs by reason of the low damping characteristics thereof, is resisted effectively by the shock absorbers when arranged and connected as herein illustrated. Thus on the occurrence of rotation of the axle and differential housings, one of the shock absorbers is operated in rebound to afford the maximum resistance to such rotation regardless of the direction thereof. Again, it will be observed that by so positioning the shock absorbers that the axes of the actuating shafts thereof are located to a considerable distance forwardly and rearwardly respectively of the axis of the axle housings, the leverage applied by these shocks absorbers in opposition to rotation of the housings is materially increased. It will be further noted that this arrangement of the shock absorbing mechanism tends to resist weaving of the frame, such weaving resulting in actuation of one or both of the shock absorbers.

It has heretofore been proposed to stabilize motor vehicles against lateral sway of the body on rounding curves at high speed by interconnecting the shock absorbers at opposite sides of the vehicle. In accordance with the present invention, body sway is resisted by means of a torsion bar 120 which extends across the frame and is provided at its opposite ends with forwardly directed arms 121 and 122. The arm 121 is secured rigidly to the arm 115 of the shock absorber 113. Adjacent the arm 122 the torsion bar 120 extends through a bushing 125 of rubber or similar deformable material, the latter being in turn secured to an inwardly directed flange 126 formed on the spring block 110 by means of a bracket 128, the latter embracing the bushing and being secured to the block. The arm 122 is connected at its forward end to the frame by means of a link 129 having articulated connection with the arm and with the side frame member 15.

It will be observed that if the body sways laterally so that one side thereof is depressed, the corresponding arm 122 or 121 will be depressed and torsion applied to the bar 120 tending to depress the other of these arms and to similarly lower the frame at the other side of the vehicle.

The shock absorbers are preferably mounted on the axle means, this term being used to designate the axle and differential housings, such an arrangement serving to simplify the actuating linkage, but it will be appreciated that shock absorbers mounted on the frame may be so connected to the axle as to afford certain of the advantages outlined herein. Such an arrangement is therefore contemplated as part of the present invention.

Referring next to Figure 12 of the drawings, it will be observed that a modified arrangement is illustrated. Since the construction is for the most part quite similar to that previously described, similar reference numerals are employed to designate corresponding elements. The distinguishing feature of the arrangement shown in Figure 12 is the provision of shock absorbing means associated with the transverse link, employed to resist body float. Thus the link, indicated at 78', is pivotally connected as at 132 to a rearwardly directed flange 133 formed on a spring seat which is constructed similarly to that shown in Figure 6 of the drawings at 106, and at its other end to the downwardly extending actuating arm 135 of a shock absorber 136, the latter being secured in any convenient manner to the lower flange of the cross frame member 17. Preferably the pivotal connections at either end of the link are in the form of universal joints, rubber being eliminated to ensure immediate response of the shock absorber 136 to any lateral movement of the body on the frame. It will of course be appreciated that the shock absorber may be secured to the axle rather than to the frame, if desired, or, alternatively, a shock absorber of the extensible type may be employed intermediate the ends of the link, the latter being pivotally connected directly to the frame and the axle.

In the construction just described, lateral swinging movement of the body on the frame, tending to persist as the result of the use of springs of low damping or of laterally yieldable connections between these springs and the frame, is effectively retarded and damped without checking or opposing the free lateral flexure of the springs which should occur on sudden relative vertical displacement of oppositely disposed road wheels.

Figures 13 and 14 illustrate a further modification of the structure hereinbefore described for resisting and damping axle housing rotation. In this form of the invention an arm 150 is secured rigidly to the differential housing 152 and extends forwardly thereof, preferably paralleling the drive shaft 153. At its forward end the arm 150 is connected by means of a link 154 to the operating arm 155 of a shock absorber 158. The shock absorber is secured to the lower flange of a transverse frame member 160, the latter extending between and being secured at its ends to the side frame members 15. Here again, the drive is of the Hotchkiss type, employing a universal joint 163 intermediate the rear end of the drive shaft and the differential gearing, and the leaf spring assemblies 164 which support the axle on the frame are constructed to afford relatively low damping. Owing to the length of the arm 150, rotation of the axle and differential housings through only a very slight angle serves to actuate the shock absorber 158, whereby such rotation is promptly and effectively resisted and damped.

Having thus described the invention, what is claimed as new and desired to be secured by Letters Patent is:

1. In a motor vehicle, the combination with a vehicle frame, of road wheels disposed at opposite sides of said frame, axle means carrying said road wheels, spring means of low damping supporting said axle means and road wheels on said frame, means acting between the axle means and frame for opposing relative lateral movement thereof, and shock absorbing means acting between said frame and said axle means to yieldably resist relative vertical movement thereof and for yieldably opposing rotation of said axle means in either direction about a transverse axis.

2. In a motor vehicle, the combination with a vehicle frame, of road wheels associated with said frame, axle means carrying said road wheels, resilient means supporting said axle means and road wheels on said frame for generally vertical movment with respect thereto, and shock absorbing means resisting relative vertical movement of said frame and axle means, said shock absorbing means being so connected to said frame and axle means as to apply to said axle means no substantial force tending to rotate the latter about a transverse axis on the occurrence of such vertical movement.

3. In a motor vehicle, the combination with a vehicle frame, of road wheels disposed at opposite sides of said frame, axle means carrying said road wheels, longitudinally extending leaf spring assemblies supporting said axle means and road wheels on said frame, friction reducing means acting between certain of the leaves of said spring assemblies, whereby the friction opposing relative longitudinal and lateral movement of adjacent leaves is materially reduced, means acting between the axle means and frame for opposing relative lateral movement thereof, and shock absorbing means resisting relative vertical movement of said frame and axle means, said shock absorbing means being so connected to said frame and axle means as to apply to said axle means no substantial force tending to rotate the latter about a transverse axis on the occurrence of such vertical movement.

4. In a motor vehicle, the combination with a vehicle frame, of road wheels associated with said frame, axle means carrying said road wheels, resilient means supporting said axle means and road wheels on said frame for generally vertical movement with respect thereto, and at least two double acting, fluid shock absorbing devices, each acting in compression and in rebound to resist rapid rising and falling movement respectively of said axle means with respect to said frame, said shock absorbing devices being so connected between said frame and axle means that rotation of said axle means in either direction about a transverse axis is resisted by at least one of said devices acting in rebound.

5. In a motor vehicle, the combination with a vehicle frame, of road wheels associated with said frame, axle means carrying said road wheels, resilient means supporting said axle means and road wheels on said frame for generally vertical movement with respect thereto, and two double acting, fluid shock absorbing devices, each acting in compression and in rebound to resist rapid rising and falling movement respectively of said axle means with respect to said frame, said shock absorbing devices being so connected between said frame and axle means that rotation of said axle means in either direction about a transverse axis is resisted by one of said devices acting in rebound and by the other of said devices acting in compression.

6. In a motor vehicle, the combination with a vehicle frame, of road wheels associated with said frame, axle means carrying said road wheels, resilient means supporting said axle means and road wheels on said frame for generally vertical movement with respect thereto, shock absorbing devices mounted on said axle means, and actuating means for said devices so connected to said frame as to impart to said axle means no substantial force tending to rotate the latter as said road wheels rise and fall.

7. In a motor vehicle, the combination with a vehicle frame, of road wheels associated with said frame, axle means carrying said road wheels, resilient means supporting said axle means and road wheels on said frame for generally vertical movement with respect thereto, a pair of shock absorbing devices mounted on said axle means, one of said devices having a rearwardly directed actuating arm, and the other of said devices having a forwardly directed actuating arm, and connections between each of said arms and said frame, whereby said devices resist relative vertical movement of said frame and axle means and rotation of the latter about a transverse axis.

8. In a motor vehicle, the combination with a vehicle frame, of road wheels associated with said frame, axle means carrying said road wheels, resilient means supporting said axle means and road wheels on said frame for generally vertical movement with respect thereto, a pair of shock absorbing devices mounted on said axle means, one of said devices having a rearwardly directed actuating arm swingable about an axis disposed rearwardly of said axle means, and the other of said devices having a forwardly directed actuating arm swingable about an axis disposed forwardly of said axle means, and connections between each of said arms and said frame, whereby said devices resist relative vertical movement of said frame and axle means and rotation of the latter about a transverse axis.

9. In a motor vehicle, the combination with a vehicle frame, of driving road wheels disposed at opposite sides of said frame, axle and differential housings supporting said road wheels, driving means for said wheels including a longitudinally extending drive shaft provided with a universal joint adjacent said differential housing, resilient means of low damping supporting said axle and differential housings on said frame for rising and falling movement with respect thereto, said resilient means yieldingly resisting rotation of said axle and differential housings about a transverse axis, and shock absorbing means acting between said housings and said frame to resist relative rising and falling movement thereof and to oppose rotation of said housings about a transverse axis.

10. In a motor vehicle, the combination with a vehicle frame, of road wheels disposed at opposite sides of said frame, axle means carrying said road wheels, longitudinally extending leaf spring assemblies supporting said axle means and road wheels on said frame, friction reducing devices acting between certain of the leaves of said spring assemblies, whereby the friction opposing relative longitudinal and lateral movement of adjacent leaves is materially reduced, means including a laterally directed link acting in parallel with said spring assemblies to oppose lateral relative movement of the axle means and frame, said link being pivotally connected to said axle means and frame, and shock absorbing means acting between said frame and said axle means for yieldably opposing rotation of said axle means in either direction about a transverse axis.

11. In a motor vehicle, the combination with a vehicle frame, of road wheels disposed at opposite sides of said frame, axle means carrying said road wheels, longitudinally extending leaf spring assemblies supporting said axle means and road wheels on said frame, friction reducing facing means acting between certain of the leaves of said spring assemblies, connections including laterally yieldable means between said springs and said frame, means including a laterally directed link acting in parallel with said spring assemblies to oppose lateral relative movement of the axle means and frame, said link being pivotally connected to said axle means and frame, a pair of shock absorbing devices mounted on said axle means, one of said devices having a rearwardly directed actuating arm, and the other of said devices having a forwardly directed actuating arm, and connections between each of said arms and said frame, whereby said devices resist relative vertical movement of said frame and axle means and rotation of the latter about a transverse axis.

12. In a motor vehicle, the combination with a vehicle frame, of driving road wheels disposed at opposite sides of said frame, axle and differential housings supporting said road wheels, driving means for said wheels including a longitudinally extending drive shaft provided with a universal joint adjacent said differential housing, resilient means of low damping supporting said axle and differential housings on said frame for rising and falling movement with respect thereto, said resilient means yieldingly resisting rotation of said axle and differential housings about a transverse axis, shock absorbing means acting between said housings and said frame to yieldably resist relative rising and falling movement thereof and to yieldably oppose rotation of said housings about a transverse axis, said shock absorbing means including a pair of fluid shock absorbers mounted on said axle housings at opposite sides of the vehicle, and connections between said shock absorbers and said frame, an actuating arm for each shock absorber, one of said arms extending forwardly and the other rearwardly, and connections between said arms and said frame.

13. In a motor vehicle, the combination with a vehicle frame, of road wheels disposed at opposite sides of said frame, axle means carrying said road wheels, longitudinally extending leaf spring assemblies supporting said axle means and road wheels on said frame, a pair of shock absorbing devices mounted on said axle means, one of said devices having a rearwardly directed actuating arm, and the other of said devices having a forwardly directed actuating arm, connections between each of said arms and said frame, whereby said devices resist rapid relative movement of said frame and axle means and rotation of the latter about a transverse axis, and sway resisting means acting between said frame and said axle means and including a transversely extending torsion bar, said bar being secured at one side of the vehicle to the actuating arm of one of said shock absorbers, being pivoted at the other side to said axle means, and having the ends thereof connected to said frame.

CLYDE R. PATON.